June 18, 1929.    H. J. DECH    1,718,118
MILK BOTTLE PROTECTOR
Filed Nov. 24, 1928
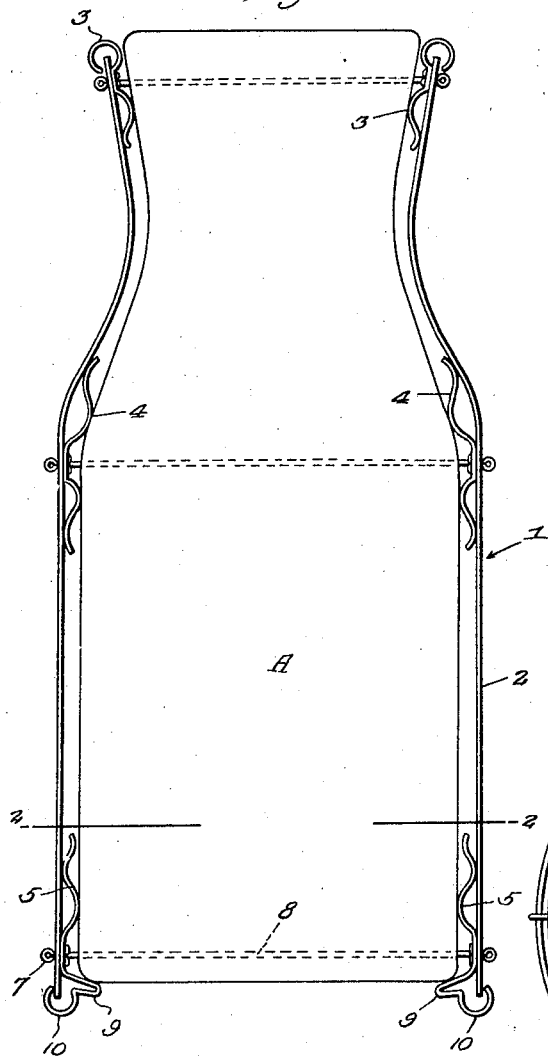
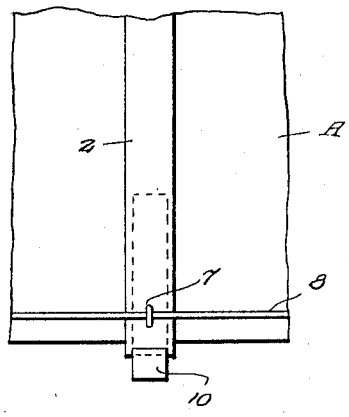
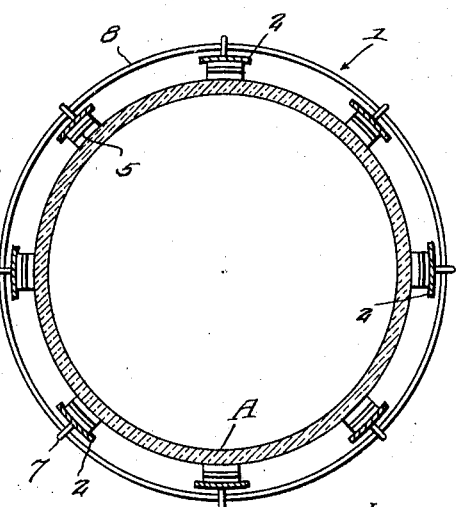
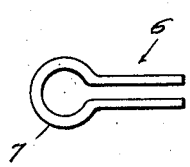
Inventor
H. J. Dech,
By Clarence A. O'Brien
Attorney Patented June 18, 1929.

1,718,118

UNITED STATES PATENT OFFICE.

HARRY J. DECH, OF PHILADELPHIA, PENNSYLVANIA.

MILK-BOTTLE PROTECTOR.

Application filed November 24, 1928. Serial No. 321,641.

The present invention relates to improvements in receptacles, and has reference more particularly to a device for receiving a milk bottle and for protecting the same against breakage while being handled either at the dairy or in transportation.

One of the important objects of the present invention is to provide a milk bottle protector wherein the bottle can be readily and easily inserted or removed with respect to the protector, spring means being provided for normally retaining the milk bottle in position within the protector against movement to further space the same with respect to the frame of the protector.

Still a further object is to provide a milk bottle protector of the above mentioned character which is simple in construction, inexpensive, strong and durable, and further well adapted to the purpose for which it is designed.

Other objects of the invention will become apparent as the nature of the invention proceeds and when taken in connection with the accompanying drawing.

In the accompanying drawing, forming a part of this application, and wherein like reference characters designate like parts throughout the several views:

Figure 1 is a vertical sectional view, through the protector embodying my invention, showing the manner in which a milk bottle is arranged therein.

Figure 2 is a transverse section taken approximately on the line 2—2 of Figure 1.

Figure 3 is a fragmentary detail elevational view of the lower end portion of one of the iron strips showing the retaining wire extending around the lower end portion thereof and around the adjacent end of the milk bottle, and also showing the adjacent spring finger, and Figure 4 is a detail view of one of the fastening elements for securing the spring fingers to the respective iron strips.

In the drawing, wherein for the purpose of illustration is shown the preferred embodiment of my invention, the numeral 1 designates generally the frame of my improved protector, the same comprising a series of spaced vertically disposed galvanized iron strips 2, the upper end portions of which are curved to conform to the curvature of the neck of a milk bottle A. The diameter of the frame is slightly greater than that of the milk bottle so that the bottle may be readily and easily inserted or removed from the frame through the bottom thereof.

Secured on the inner side of each iron strip 2 are preferably three spring fingers, the uppermost one being denoted by the reference character 3, the intermediate one by the numeral 4, and the lowermost one by the numeral 5. The securing means for each of the spring fingers is shown at 6, in Figure 4, and said fastening means includes an eye portion 7 that extends beyond the outer side of the strip so that the wire rings 8 may be properly supported about the strips of the frame 1, at the top, intermediate and bottom portions thereof, as clearly indicated in Figures 1 and 2 of the drawing.

Each of the spring fingers is formed with a hump portion that engages with the milk bottle and an opposed hump is also formed in each spring finger for engagement with the inner face of the respective strip so that the milk bottle will be properly spaced from the frame, and this in a resilient manner. It will also be noted that the lowermost spring fingers are formed with bottom engaging portions 9 that are directed inwardly to form a rest for the bottom of the bottle, and these lowermost spring fingers terminate at their lower extremities in surface engaging feet 10.

It will thus be seen from the foregoing description that I have provided a milk bottle protector that will prevent breakage of the bottle during handling, and the protector is of such construction as to permit the bottle to be removed whenever necessary for cleaning purposes and this is accomplished by forcibly moving the bottle through the bottom of the frame, it being understood, of course that the lowermost wire will give sufficiently to permit the withdrawal of the bottle.

While I have shown the preferred embodiment of my invention, it is to be understood that various changes in the size, shape and arrangement of parts may be resorted to, without departing from the spirit of the invention or the scope of the appended claims.

I claim:

1. In a milk bottle protector of the class described, a frame including a series of spaced vertically disposed flat strips, flexible elements encircling the strips at vertically spaced intervals to interconnect the same, and spring fingers secured on the inner side of each strip for engagement with the adjacent portion of the bottle to space the same from the strips and support the same within the frame, the lowermost spring fingers having their lower ends directed inwardly to provide a support for the bottom of the bottle.

2. In a milk bottle protector of the class described, a frame including a series of spaced vertically disposed flat strips, flexible elements encircling the strips at vertically spaced intervals to interconnect the same, and spring fingers secured on the inner side of each strip for engagement with the adjacent portion of the bottle to space the same from the strips and support the same within the frame, the lowermost spring fingers having their lower end portions directed inwardly to provide a support for the bottom of the bottle, the lower extremities of the lowermost spring fingers being bent to form surface engaging feet.

In testimony whereof I affix my signature.

HARRY J. DECH.